United States Patent [19]

Gomes et al.

[11] E Patent Number: Re. 32,612

[45] Reissued Date of Patent: Feb. 23, 1988

[54] FORMATION OF TUNGSTEN MONOCARBIDE FROM A MOLTEN TUNGSTATE-HALIDE PHASE BY GAS SPARGING

[75] Inventors: John M. Gomes, Reno; Andrea E. Raddatz, Sparks; Elizabeth G. Baglin, Reno, all of Nev.

[73] Assignee: The United States of America as represented by the Secretary of the Interior, Washington, D.C.

[21] Appl. No.: 855,284

[22] Filed: Apr. 24, 1986

Related U.S. Patent Documents

Reissue of:

[64] Patent No.: 4,489,044
Issued: Dec. 18, 1984
Appl. No.: 574,499
Filed: Jan. 27, 1984

U.S. Applications:

[63] Continuation-in-part of Ser. No. 544,299, Oct. 21, 1983, abandoned.

[51] Int. Cl.[4] ..... C01G 41/00

[52] U.S. Cl. ..... 423/53; 423/440; 423/DIG. 12

[58] Field of Search ..... 423/53, 440, DIG. 12

[56] References Cited

U.S. PATENT DOCUMENTS

| | | | |
|---|---|---|---|
| 3,373,097 | 3/1968 | Gomes et al. | 204/64 R |
| 3,482,941 | 12/1969 | Palm | 423/440 |
| 3,692,479 | 9/1972 | Meadows et al. | 423/440 |
| 3,902,917 | 9/1975 | Baresel et al. | 423/440 |
| 4,190,439 | 2/1980 | Gortsema | 423/440 |
| 4,256,496 | 3/1981 | Brandstatler | 423/53 |

FOREIGN PATENT DOCUMENTS

| | | | |
|---|---|---|---|
| 1190713 | 5/1970 | United Kingdom | 423/440 |

*Primary Examiner*—Robert L. Stoll
*Attorney, Agent, or Firm*—E. Philip Koltos

[57] ABSTRACT

Tungsten monocarbide is prepared by sparging a molten composition comprising an alkali metal halide and an oxygen compound of tungsten with a gas comprising a gaseous hydrocarbon, particularly methane.

11 Claims, No Drawings

FORMATION OF TUNGSTEN MONOCARBIDE FROM A MOLTEN TUNGSTATE-HALIDE PHASE BY GAS SPARGING

Matter enclosed in heavy brackets [ ] appears in the original patent but forms no part of this reissue specification; matter printed in italics indicates the additions made by reissue.

This application is a continuation-in-part of pending application Ser. No. 544,299, filed Oct. 21, 1983 *now abandoned.*

This invention relates to a process for preparation of tungsten monocarbide (WC) from oxygen compounds of tungsten.

Recent technological advances have resulted in an ever increasing demand for materials that are capable of delivering constant chemical and physical performances under a variety of extreme operating conditions. For example, the development of supersonic aircraft and rockets is based upon the availability of such materials.

One material of relatively recent importance is tungsten. Tungsten possesses a high melting point and is useful in its elemental form, particularly as an alloy for high-temperature applications. Tungsten is also useful in the form of tungsten monocarbide for use in abrasives and cutting instruments. As the demand for increased availability of such materials has advanced, so has the necessity for improved techniques for their production and recovery.

In the past, recovery of tungsten from its ores was an expensive and relatively complex process involving both physical and chemical separation procedures. Tungsten was usually recovered either from wolframite, $(Fe,Mn)WO_4$, or scheelite, $CaWO_4$, by various pyrometallurgical and extraction procedures. The carbide final product would then be obtained by reacting the purified metal with carbon in another sequence of reactions.

The predominant commercial process for the preparation of tungsten carbide from wolframite or scheelite concentrates requires many steps because the preparation of high purity tungsten powder is necessary before synthesis of tungsten carbide.

In the commercial production of tungsten monocarbide by direct synthesis, tungsten powder is mixed with 6.2–6.9% carbon. This amount of carbon is 2–10% in excess of the stoichiometric amount in WC (6.13%) and is required to decrease the oxygen content. The mixture is usually blended in a rotary blender containing steel or tungsten carbide balls. Typically one-half of the tungsten powder will be added to all of the carbon, blended for several hours, and this is followed by the addition of the remaining tungsten powder and additional several hours of blending. Careful blending procedures are required, particularly in the case of coarse tungsten powder, because of great disparity in density of the constituents and the size effects of the particles. The tungsten-carbon mixture is next put into graphite boats and passed continuously through a tube furnace. The furnace may be either gas fired or electrically heated, but must be maintained in the temperature range of 1,400° to 1,600° C. Hydrogen is usually introduced into the discharge end of the tube and is burned off at the charging end. The time per furnace cycle is 4 to 5 hours.

The major disadvantage of this process is the requirement for high purity tungsten powder as the feed material for synthesis of the carbide. The complete process for preparing monocarbide from ore concentrates includes the following steps: (1) pressure digestion to decompose the ore, (2) solution purification, (3) solvent extraction, (4) ammonium hydroxide stripping, (5) ammonium paratungstate crystallization, (6) formation of tungsten metal by hydrogen reduction, and (7) carbide synthesis.

Aluminothermic reduction is also used to produce WC from ore concentrates. This process consists of blending the concentrates, aluminum, calcium carbide and other reagents in a tear-down carbon lined refractory furnace. A thermite reaction is started and the whole mass becomes molten, thereby producing a slag and an iron-manganese alloy containing WC crystals. The furnace is cooled in about 10–14 days and the slag and menstruum separated. The menstruum is then crushed and leached to yield a coarse WC product. The coarse WC crystals next are ground in a WC rod or ball mill and yield a commercial WC product.

This technique, however, is also disadvantageous in that it requires a large amount of energy for size reduction and leaching the menstruum, and also for the size reduction of the recovered WC crystals. Additionally, the carbide thus formed is not suitable for preparing many cemented carbide products.

U.S. Pat. No. 3,482,941 to Palm discloses another method for recovering tungsten in the form of tungsten carbide from scheelite by heating ore with silica and carbon. This process is said to reduce the amount of ditungsten carbide which is commonly formed when tungsten carbide is prepared at elevated temperatures.

U.S. Pat. No. 4,256,496 to Brandstatter discloses an additional process for the recovery of metal ores utilizing a solid state reduction and carburization reaction. The disclosed process utilizes physical separation techniques, such as gravity separation employing water elutriation. The separation is based upon the different physical properties of metal carbides and various gangue oxide constituents of ores at elevated temperatures.

It has now been found, according to the present invention, that preparation of tungsten monocarbide from oxygen compounds of the metal may be efficiently and economically accomplished by subjecting a melt of an alkali metal halide and the tungsten compound to sparging with a hydrocarbon gas. The process of the invention has been found to be particularly applicable to preparation of tungsten monocarbide from tungstic oxide or tungstates such as sodium tungstate and ammonium paratungstate.

The preferred alkali metal halide will generally be sodium chloride since it is usually most readily available and economical. However, the alkali metal halide may also consist of fluorides or bromides of sodium, potassium, or lithium. In addition, mixed metal compounds such as NaAlF or KAlF may also be used.

Proportions of the alkali metal halide and the tungsten compound are not critical, provided the amount of halide is sufficient for ready formation of a homogenous melt for treatment with the hydrocarbon gas. The percent of tungsten (in percent $WO_3$ by weight) will generally range from about 5 to 30. Formation of the melt is accomplished by simply heating an admixture of halide and tungsten compound to a temperature and for a time sufficient to form a melt of sufficient fluidity for sparging with the hydrocarbon gas. A temperature of about 900° to 1100° C. and a time of about 3 to 8 hours is usually sufficient.

Formation of the melt, as well as the sparging, may be carried out in a crucible of any conventional refractory material such as graphite, or ceramics such as alumina, magnesia, zircon or silicon carbide. However, it has been found that refractory metal alloys, such as Inconel, are particularly effective in the process of the invention.

The preferred hydrocarbon gas will generally be methane, or natural gas. However, other hydrocarbons, such as ethane, acetylene, propane or butane may also be used. In addition, mixtures of the hydrocarbon gas, or gases, with $H_2$ or CO may be used. Furthermore, other reductants such as powdered charcoal, coke breeze or calcium carbide may be added to the sodium chloride melt to facilitate reduction during the sparging process. It has also been found that addition of small amounts of alkali borates, carbonates, fluorides or hydroxides to the melt may assist in reduction and crystal growth.

Sparging is by conventional means using sparging tubes of any suitably inert material such as graphite, alumina or Inconel. A temperature of about 900° to 1100° C. and a methane flow rate of about 4 to 12 liters per minute per liter of melt for a period of about 3 to 8 hours is usually sufficient to give substantially complete conversion of tungsten to WC. A vacuum or inert atmosphere may also be beneficial in the sparging process.

The WC product has a density greater than the melt, and forms a separate phase. The phases are readily separated by decanting the tungsten-depleted phase from the melt, after which the WC-rich composition is cooled and water leached to remove adhering salt from the WC product. The WC product may then be further purified by leaching with dilute HCl solution, followed by dilute caustic solution, and water washing, and is then dried. The dried WC product may be further purified by treatment for removal of any free carbon by a conventional heavy liquid treatment, resulting in gravity separation of the carbon from the heavier WC. Diiodomethane has been found very effective for this purpose, although other heavy liquids such as acetylene tetrabromide may be used. The free carbon can also be removed by floation or gravity methods.

The process of the invention has been found to be particularly effective in preparation of WC from concentrates of tungsten ores such as scheelite or wolframite. A sodium tungsten-sodium chloride compostion is initially prepared by means of the process of U.S. Pat. No. 3,373,097, the disclosure of which is incorporated herein by reference. In this process a melt comprising the ore concentrate, sodium chloride and sodium silicate is held at elevated temperature for a time sufficient to form separate halide and silicate phases. Sodium tungstate is formed by the reaction (in the case of wolframite)

$$2(Fe,Mn)WO_4+3Na_2SiO_3 \rightarrow 2Na_2WO_4+Na_2(Fe,Mn)_2Si_3O_9$$

and concentrates in the halide phase, with gangue materials concentrating in the silicate phase. The phases are separated, and the resulting $NaCl\text{-}Na_2WO_4$ composition is then treated according to the process of the present invention for formation of WC.

The invention will be more specifically illustrated by the following examples.

EXAMPLE 1

Feed material-Colorado wolframite concentrate

| Analysis, pct | | |
|---|---|---|
| $WO_3$ | $Fe_2O_3$ | MnO |
| 69.1 | 9.1 | 13.5 |

High temperature phase separation

| Charge | grams |
|---|---|
| Wolframite | 484 |
| NaCl | 704 |
| $Na_2SiC_3$ | 291 |
| | 1,479 |

The charge was melted for 2 hours at 1,075° C. in a silicon carbide crucible. Molten charge was removed from the furnace and the two molten phases were decanted into separate slag pots. The upper halide phase was fluid and easily separated from the lower silicate phase which was very viscous.

| | Analysis of the phases, pct | | | |
|---|---|---|---|---|
| | Wt. g | $WO_3$ | FeO | MnO |
| Halide | 980 | 31.4 | 0.05 | 0.17 |
| Silicate | 440 | 4.5 | 9.3 | 13.4 |
| | 1,420 | | | |

The halide phase containing 92 pct of the $WO_3$ in the wolframite was treated by methane gas sparging.

Gas Sparging of the Halide Phase

A 600-gram charge of the halide phase was melted in a 3" I.D.×7" high graphite crucible at 1,100° C. A graphite tube with four 1/16" holes at the bottom was used as a gas sparger. Methane was passed through the tube for 6 hours at a rate of 4 liters/min STP. The gas was turned off, the sparging tube removed and the remaining molten salt in the crucible was decanted into a slag pot. The cooled crucible was then water leached and scraped to recover the WC product. The WC product was leached in dilute HCl and NaOH solutions, and free carbon removed by heavy liquid treatment.

Results

WC recovered = 128 g
W recovered as WC, pct = 81
Final melt, g = 310
Final melt, pct $WO_3$ = 10
Final melt, g $WO_3$ = 31
X-ray diffraction
Major WC, trace C
No $W_2C$ detected Spectrographic analysis of WC product, pct

| Al | Cu | Fe | Mg | Mn | Mo | Si | Sn | Ti | V |
|---|---|---|---|---|---|---|---|---|---|
| 0.005 | 0.007 | 0.10 | 0.005 | 0.05 | <.001 | 0.07 | 0.009 | 0.01 | 0.006 |

Other impurities below detection limits.

Carbon and oxygen analysis, pct

C = 6.19
O = 0.34

Specs for Commercial WC

| | Max. pct |
|---|---|
| Free carbon | 0.10 |
| Fe | 0.15 |
| Mo | 0.10 |

Stoichiometric carbon content of WC = 6.13 pct.

EXAMPLE 2

| Feed material - California scheelite concentrate | |
|---|---|
| Analysis, pct | |
| $WO_3$ CaO $Fe_2O_3$ | |
| 69.3 18.1 2.6 | |
| High Temperature phase separation | |
| Charge | grams |
| Scheelite | 432 |
| NaCl | 420 |
| NaF | 201 |
| $Al_2O_3$ | 72 |
| $Al_2SiO_3$ | 366 |
| | 1,491 |

The phase separation was made with the same procedure as that of Example 1.

The molten phases were decanted into separate slag pots.

| | Analysis of the phases, pct | | |
|---|---|---|---|
| | Wt. g | $WO_3$ | CaO |
| Halide | 909 | 31.5 | 0.22 |
| Silicate | 515 | 2.0 | 14.5 |
| | 1,424 | | |

Gas Sparging of Halide Phase

The halide phase containing 96 pct of the $WO_3$ from the scheelite was treated by natural gas sparging. The natural gas contained, in pct: methane, 93.63; carbon dioxide, 0.70; nitrogen, 0.47; ethane, 3.58; propane, 1.02; other hydrocarbons, 0.60.

A 600-gram charge was melted at 1,100° C. in a 3" I.D.×7" high graphite crucible. A ¼" O.D.×⅛" I.D. Alundum tube was used for gas sparging the melt. Natural gas was passed through the melt for 6 hours at a rate of 4 liters/min STP. The tube was removed and the remaining molten salt in the crucible was decanted into a slag pot. The WC was recovered from the cooled crucible by water leaching and scraping. The WC product was leached in dilute HCl and NaOH solutions, and treated for free carbon removal in heavy liquids.

| Results | | | | | | | | | |
|---|---|---|---|---|---|---|---|---|---|
| WC recovered = 120 g | | | | | | | | | |
| W recovered as WC, pct = 75 | | | | | | | | | |
| Final melt, g = 360 | | | | | | | | | |
| Final melt, pct $WO_3$ = 9.5 | | | | | | | | | |
| Final melt, g $WO_3$ = 34.0 | | | | | | | | | |
| x-ray Diffraction of WC product | | | | | | | | | |
| Major WC | | | | | | | | | |
| Spectrographic analysis of WC product, pct | | | | | | | | | |
| Al | Cu | Fe | Mg | Mn | Mo | Si | Sn | Ti | V |
| 0.005 | 0.007 | 0.1 | 0.005 | 0.05 | 0.001 | 0.05 | 0.003 | 0.005 | <.006 |
| Other impurities below detection limits. | | | | | | | | | |
| Carbon and oxygen analysis, pct | | | | | | | | | |
| C = 6.31 | | | | | | | | | |
| O = 0.32 | | | | | | | | | |

EXAMPLE 3

Gas Sparging of Halide Phase Prepared from Wolframite in a Metal Alloy Crucible A 1,600 gram charge of halide phase prepared according to the procedure of Example 1, and containing 25 wt pct $WO_3$, was melted in an Inconel 600 crucible 3" I.D.×12" high. A ¼" Inconel pipe was the sparging tube. The melt was heated to 1,070° C. and methane sparged for 4 hours at a gas flow rate of 5 liters per minute STP. The WC was recovered by decanting off the unreacted melt, cooling the crucible and water leaching and scraping. The WC product was leached in dilute HCl and NaOH solutions, water washed and dried.

| Results | | | | | | | | | | |
|---|---|---|---|---|---|---|---|---|---|---|
| WC recovered = 181.5 g | | | | | | | | | | |
| W recovered as WC, pct = 54 | | | | | | | | | | |
| Final melt, g = 992 | | | | | | | | | | |
| Final melt, pct $WO_3$ = 15.5 | | | | | | | | | | |
| Final melt, g $WO_3$ = 153.8 | | | | | | | | | | |
| X-Ray Diffraction | | | | | | | | | | |
| Major WC | | | | | | | | | | |
| Spectrographic analysis of WC product, pct | | | | | | | | | | |
| Al | Ca | Cr | Cu | Fe | Mg | Mn | Mo | Na | Ni | Si |
| .005 | <.01 | 0.1 | .002 | .04 | .001 | .001 | .05 | .04 | .02 | .02 |
| Other impurities below detection limits. | | | | | | | | | | |
| Carbon and oxygen analysis, pct | | | | | | | | | | |
| C = 6.19 | | | | | | | | | | |
| O = 0.07 | | | | | | | | | | |

The Inconel crucible was used a total of 5 times with similar results. A major advantage of using the Inconel crucible was that free carbon was not detected in the WC product, thus eliminating a free carbon cleaning step.

EXAMPLE 4

| WC from $Na_2WO_4$ | |
|---|---|
| Charge | grams |
| NaCl | 440 |
| $Na_2WO_4$ | 160 |
| | 600 |

Procedure

The charge was melted in an alumina ceramic crucible 2¾" I.D.×6" high, at 1,100° C. Methane gas was passed through the melt for 6 hours at a flow rate of 4 liters/min STP.

| Results | | | | | | | | | | | |
|---|---|---|---|---|---|---|---|---|---|---|---|
| WC recovered = 92 g | | | | | | | | | | | |
| W recovered as WC, pct = 86 | | | | | | | | | | | |
| Final melt, g = 260 | | | | | | | | | | | |
| Final melt, pct $WO_3$ = 6.2 | | | | | | | | | | | |
| Final melt, g $WO_3$ = 16 | | | | | | | | | | | |
| Spectrographic analysis of WC product, pct | | | | | | | | | | | |
| Al | B | Cu | Fe | Mg | Mn | Na | Pb | Si | Sn | Ti | Zr |
| 0.05 | 0.004 | 0.01 | 0.03 | 0.02 | 0.02 | 0.4 | <.01 | 0.1 | <.002 | 0.01 | 0.1 |

WC was also prepared in NaCl-$Na_2WO_4$ melts containing 50 pct $WO_3$. The WC yield was about 50 pct.

EXAMPLE 5

| WC from $WO_3$ | |
|---|---|
| Charge | grams |
| NaCl | 500 |
| $WO_3$ | 100 |
| $Na_2CO_3$ | 46 |
| | 646 |

-continued

| WC from $WO_3$ | |
|---|---|
| Charge | grams |
| Procedure: | |
| Temperature, 1,100° C. | |
| Graphite crucible, 3" I.D. × 7" high | |
| ¼" alumina sparging tube | |
| Methane gas sparged for 6 hours at a flow rate of 3 liters/min STP | |
| Results | |
| WC recovered = 68 g | |
| W recovered as WC, pct = 80 | |
| Final melt, g = 398 | |
| Final melt, pct $WO_3$ = 5.0 | |
| Final melt, g $WO_3$ = 19.9 | |

The analyses were similar to those obtained in Example 4.

EXAMPLE 6

| WC from ammonium paratungstate (89 pct $WO_3$) | |
|---|---|
| Charge | grams |
| NaCl | 500 |
| APT | 140 |
| NaOH | 43 |
| | 683 |

Procedure

The charge was melted in a 3" I.D.×7" high graphite crucible at 1,100° C. Methane gas was passed through a ¼" alumina tube into the melt for 6 hours at a flow rate of 4 liters/min STP. Ammonia gas was given off during heating of the APT prior to melting.

| Results: |
|---|
| WC recovered = 74 g |
| W recovered as WC, pct = 70 |
| Final melt, g = 307 |
| Final melt, pct $WO_3$ = 7.5 |
| Final melt, g $WO_3$ = 23.0 |

The analyses were similar to those obtained in Example 4.

We claim:

1. A process for preparation of tungsten monocarbide comprising:
   (a) providing a molten composition comprising an alkali metal halide and an oxygen compound of tungsten;
   (b) sparging said composition with a gas comprising a gaseous hydrocarbon which is selected from the group consisting of natural gas, methane, ethane, acetylene, propane, butane, mixtures thereof, and admixtures of these gases with $H_2$ or CO, at a temperature of about 900° to 1100° C. for a sufficient time for the tungsten compound to be substantially converted to tungsten carbide; and
   (c) decanting the molten halide from the tungsten carbide product.

2. The process of claim 1 wherein the alkali metal halide is sodium chloride.

3. The process of claim 1 in which the oxygen compound of tungsten is tungstic oxide, an alkali metal tungstate, or ammonium tungstate.

4. The process of claim 3 in which the tungsten compound is sodium tungstate.

5. The process of claim 1 in which the gaseous hydrocarbon is methane or natural gas.

6. The process of claim 1 in which the tungsten carbide product is cooled and purified by water leaching.

7. The process of claim 1 in which the molten composition consists essentially of a mixture of sodium chloride and sodium tungstate.

8. The process of claim 7 in which the NaCl-$Na_2WO_4$ mixture is prepared by forming a melt comprising a tungsten ore concentrate, sodium chloride and sodium silicate, whereby the tungsten concentrates in the sodium chloride phase.

9. The process of claim 8 in which the tungsten ore is scheelite or wolframite.

*10. The process of claim 1, wherein a reductant is included in the molten composition.*

*11. The process of claim 10, wherein the reductant is selected from the group consisting of powdered charcoal, coke breeze and calcium carbide.*

* * * * *